(12) United States Patent
Tanaka

(10) Patent No.: US 6,778,731 B2
(45) Date of Patent: Aug. 17, 2004

(54) CONTROL METHOD OF RECEIVED POWER IN OPTICAL COMMUNICATION, OPTICAL TRANSMISSION APPARATUS, OPTICAL RECEIVING APPARATUS, AND OPTICAL COMMUNICATION SYSTEM

(75) Inventor: Masato Tanaka, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 116 days.

(21) Appl. No.: 10/290,312

(22) Filed: Nov. 8, 2002

(65) Prior Publication Data

US 2003/0099020 A1 May 29, 2003

(30) Foreign Application Priority Data

Nov. 26, 2001 (JP) ........................................ 2001-359427

(51) Int. Cl.[7] ................................................. G02B 6/28
(52) U.S. Cl. ........................................ 385/24; 340/901
(58) Field of Search ................... 385/24, 147; 359/161, 359/154; 340/933, 901, 905, 925

(56) References Cited

U.S. PATENT DOCUMENTS

| | | | | |
|---|---|---|---|---|
| 6,130,626 A | * | 10/2000 | Kane et al. | ................. 340/905 |
| 6,310,561 B1 | * | 10/2001 | Nomura et al. | ............. 340/905 |
| 6,639,520 B2 | * | 10/2003 | Nomura et al. | ............. 340/905 |
| 2002/0121990 A1 | * | 9/2002 | Nomura et al. | ............. 340/933 |
| 2003/0050082 A1 | * | 3/2003 | Nomura et al. | ............. 455/503 |
| 2003/0099020 A1 | * | 5/2003 | Tanaka | ........................ 359/161 |

FOREIGN PATENT DOCUMENTS

JP          10-243475          9/1998

* cited by examiner

*Primary Examiner*—Akm Enayet Ullah
(74) *Attorney, Agent, or Firm*—Louis Woo

(57) ABSTRACT

Received power desired by a receiving end is controlled from a transmitting end without mounting an AGC circuit on an optical receiving apparatus.

In an optical communication system that transmits an optical signal output from an optical transmission apparatus 11 to an optical receiving apparatus 13, the optical transmission apparatus comprises a signal processing unit 11C for receiving a level signal fed back from the optical receiving apparatus, and a level adjustment unit 11B for adjusting output power of an optical signal of the optical transmission apparatus on the basis of the level signal so that the received power of the optical signal received by the optical receiving apparatus may be constant. The optical receiving apparatus comprises a level signal generating unit 13A for generating a level signal reflecting a value of the received power and giving feedback to the optical transmission apparatus.

5 Claims, 5 Drawing Sheets

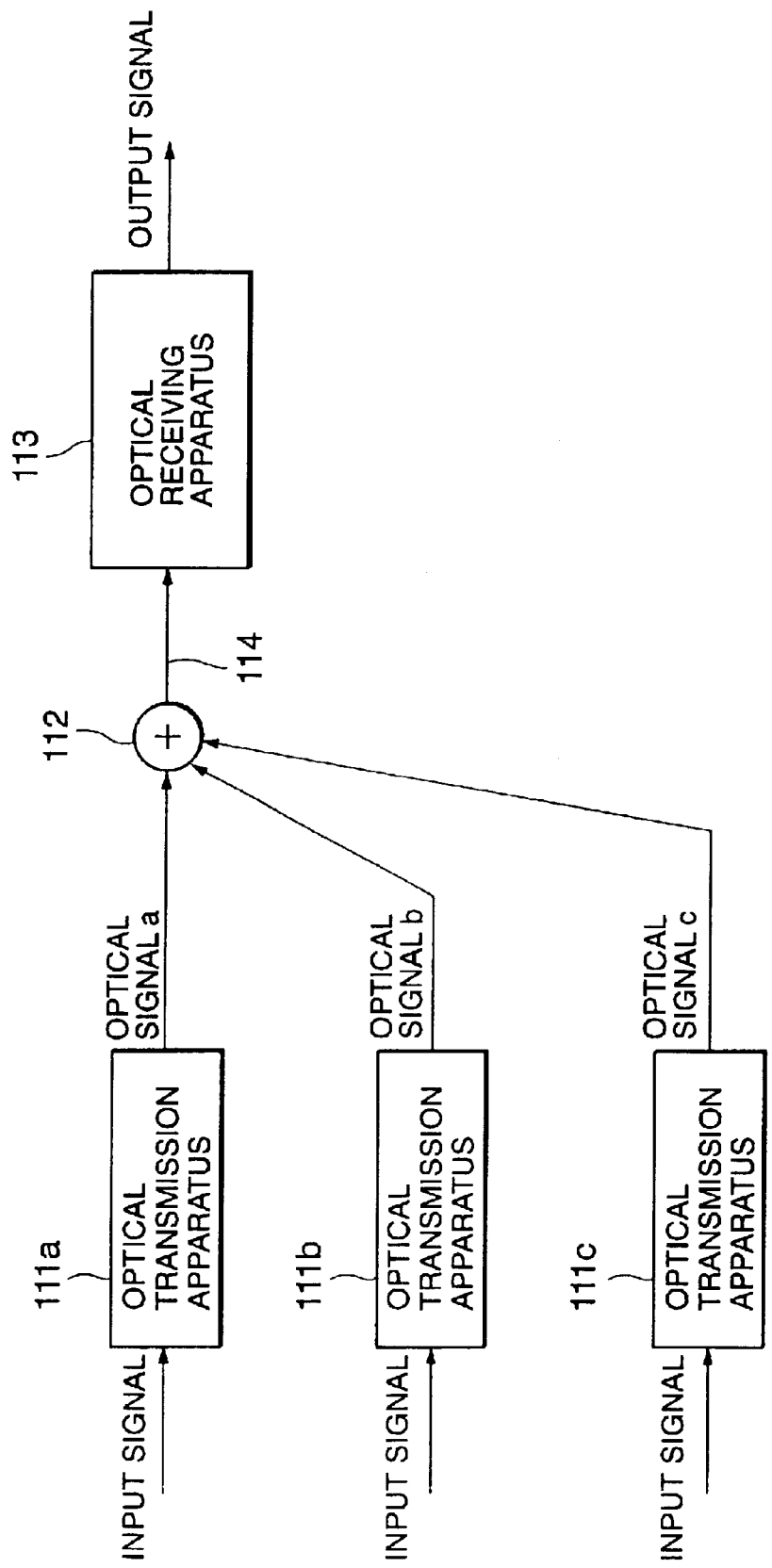

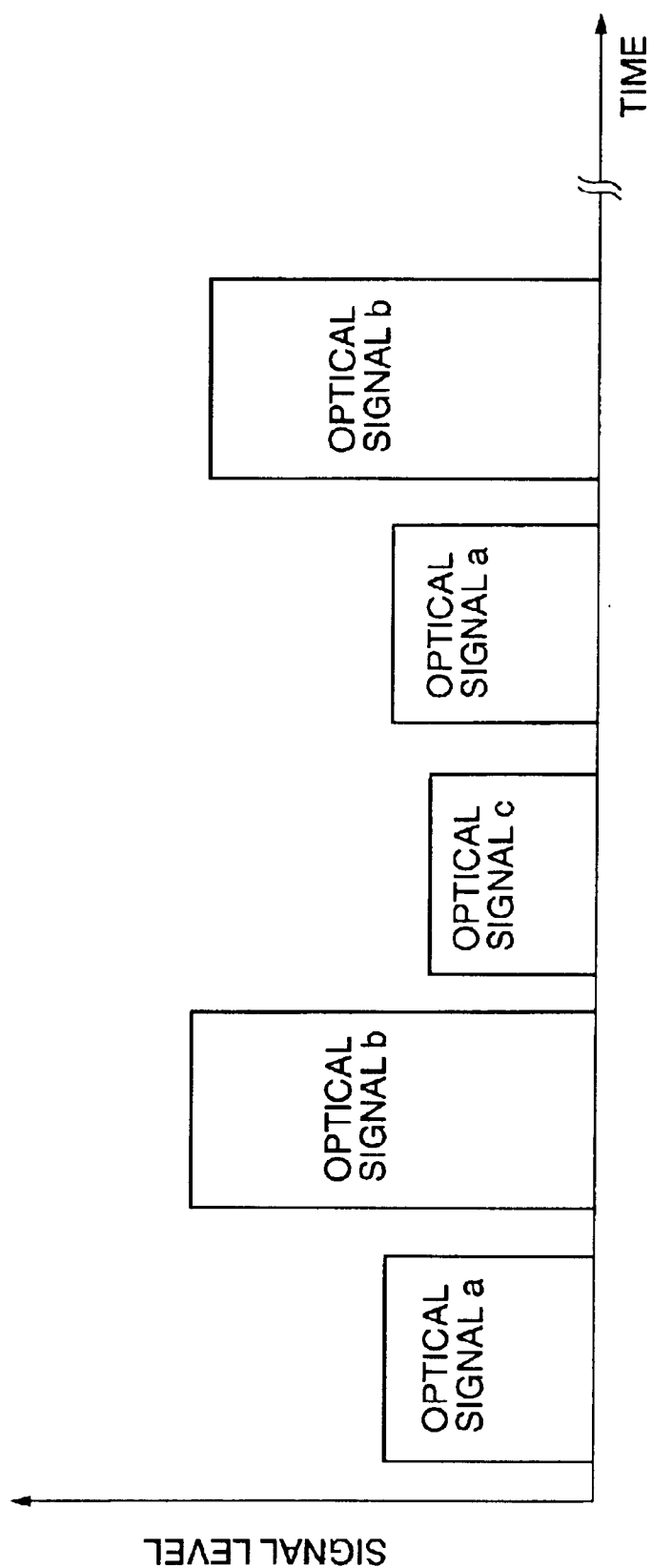

CONTROL METHOD OF RECEIVED POWER IN OPTICAL COMMUNICATION, OPTICAL TRANSMISSION APPARATUS, OPTICAL RECEIVING APPARATUS, AND OPTICAL COMMUNICATION SYSTEM

BACKGROUND OF THE INVENTION

1. Field of the Invention

The present invention relates to a control method of received power for controlling received power of an optical signal in optical communication, an optical transmission apparatus, an optical receiving apparatus, and an optical communication system having such a control function.

2. Description of the Related Art

A system for performing optical communication usually comprises an optical transmission apparatus for transmitting an optical signal, and an optical receiving apparatus for receiving the optical signal transmitted from the optical transmission apparatus.

An example of the system for performing optical communication of this kind is disclosed in Japanese Patent Publication Laid-open No. 10-243475. This optical communication system is a system suitable for, for example, an optical cordless remote control, in which optical signals are transmitted and received bidirectionally between a main device and a sub device. Specifically, the main device emits a reference signal of a constant output, and transmits this signal to the sub device. The sub device receives the reference signal, detects signal intensity from this reference signal, performs an output adjustment in accordance with this signal intensity, and transmits an optical signal in accordance with the output adjustment to the main device.

When receiving the reference signal from the main device, the sub device functions as a receiving apparatus. For this reason, the sub device comprises an optical receiving unit for converting the reference signal, which is the received optical signal, into an electric signal, and an AGC (automatic gain control) circuit for adjusting power of the electric signal output from the optical receiving unit to a constant level. In this way, it is possible to obtain effects such as constantly optimized power consumption in the sub device (receiving apparatus).

FIG. 3 schematically shows such a conventional optical communication system. An optical signal output from one optical transmission apparatus 101 is transmitted to one optical receiving apparatus 103 through a transmission path 102. The power of the optical signal is attenuated while passing through the transmission path 102. The optical receiving apparatus 103 has an optical receiving unit 103a for converting the received optical signal into an electric signal, and an AGC circuit 103b for adjusting the power of the electric signal to a constant level after the conversion.

Furthermore, FIG. 4 is a block diagram schematically showing the optical communication system for switching and receiving the optical signals output from a plurality of optical transmission apparatuses. The optical communication system in this drawing comprises three optical transmission apparatuses 111a to 111c, and each of the optical transmission apparatuses 111a (to 111c) outputs optical signals a (to c) by time division. The optical signals a to c from the three optical transmission apparatuses 111a to 111c are multiplexed by an optical multiplexer 112, and transmitted to the one optical receiving apparatus 113 via an optical transmission path 114. The optical receiving apparatus 113 receives the optical signals transmitted in a multiplexed state, and performs the same receiving processing and AGC as in FIG. 3 by time division.

In the case of the optical communication system comprising the plurality of optical transmission apparatuses 111a to 111c, every optical transmission apparatus might transmit a signal at a different level, and losses in the transmission paths might be different. In such a case, as schematically shown in FIG. 5, the levels of the optical signals a to c received by the optical receiving apparatus 113 are different with respect to every optical transmission apparatus.

However, in the conventional optical communication system, as described above, while the AGC circuit is required on the side of the optical receiving apparatus such as the sub device in order to make the received power constant, this AGC circuit can not control the level of the optical signal received by the optical receiving apparatus not to exceed an absolute maximum rating of the apparatus. In addition, when the power of the optical signal received by the optical receiving apparatus is lower than a minimum light receiving power, it is not possible to recognize such an abnormality on the side of the transmission apparatus. That is, in the case of the conventional optical communication system, the AGC circuit is exclusive to the gain control, and it is impossible to control to bring into a power value desired at the receiving end from the transmitting end or monitor a transmission state.

In addition, in the optical communication system provided with a plurality of optical transmission apparatuses as described above, if switching time when the optical signals output from each of the optical transmission apparatuses are time-divided is at high speed, the AGC circuit built in the optical receiving apparatus is also required high-speed response in accordance with it. However, even in the AGC circuit having such a high-speed switching function, an insufficiency of function still remains, as described above.

SUMMARY OF THE INVENTION

The present invention has been achieved in view of such a situation concerning control of received power in conventional optical communication systems, and an object thereof is to ensure power of an optical signal to be controlled by an optical receiving apparatus without using an AGC circuit in the optical receiving apparatus.

To attain the foregoing object, a control method of received power in optical communication, an optical transmission apparatus, the optical receiving apparatus, and an optical communication system in accordance with the present invention comprise the following means:

Firstly, a control method of received power in optical communication in accordance with the present invention is a control method in optical communication in which an optical signal is transmitted from a transmitting end to a receiving end, wherein information on the received power of said optical signal received by said receiving end is fed back from said receiving end to said transmitting end; and said transmitting end adjusts output power of said optical signal so that the received power at said receiving end may be constant. In this way, it is possible to widely control the power (level) of the optical signal at the receiving end, without using the AGC (automatic gain control) for making the received power constant at the receiving end. As a result, the received power can be controlled not to exceed an absolute maximum rating of the receiving end. In addition, it is possible to know an abnormality in a transmission state also at the transmitting end with the information fed back, when the received power is lower than a minimum light receiving power necessary at the receiving end.

Secondly, an optical transmission apparatus for transmitting an optical signal to an optical receiving apparatus in accordance with the present invention comprises information receiving means for receiving information on received power of said optical signal fed back from said optical receiving apparatus; and power adjustment means for adjusting output power of said optical signal on the basis of the information received by said information receiving means so that the received power of said optical signal received by said optical receiving apparatus may be constant. In this way, since the optical transmission apparatus transmits the power received by the optical receiving apparatus in a state already made constant, it is no longer necessary for the optical receiving apparatus to be equipped with the AGC circuit.

Thirdly, an optical receiving apparatus for receiving an optical signal transmitted from an optical transmission apparatus in accordance with the present invention comprises feedback means for feeding back information on the received power of said optical signal to said optical transmission apparatus. Since the power of the optical signal transmitted to the optical receiving apparatus is already made constant by giving the feedback, it is no longer necessary for this optical receiving apparatus to be equipped with the AGC circuit.

Fourthly, in an optical communication system for transmitting an optical signal output from an optical transmission apparatus to an optical receiving apparatus in accordance with the present invention, said optical transmission apparatus comprises information receiving means for receiving information on received power of said optical signal fed back from said optical receiving apparatus, and power adjustment means for adjusting output power of said optical signal from said optical transmission apparatus on the basis of the information received by the information receiving means so that the received power of said optical signal received by said optical receiving apparatus may be constant; and said optical receiving apparatus comprises feedback means for feeding back said information to said optical transmission apparatus. In this way, since the optical transmission apparatus transmits the power received by the optical receiving apparatus in a state already made constant, it is no longer necessary for the optical receiving apparatus to be equipped with the AGC circuit. Therefore, it is possible to widely control the power (level) of the received optical signal, without using the AGC circuit in the optical receiving apparatus. As a result, the received signal can be controlled not to exceed the absolute maximum rating of the optical receiving apparatus, which can not be controlled by the AGC. In addition, when the received power is lower than the minimum light receiving power necessary for the optical receiving apparatus, it is possible to recognize an abnormality in a transmission state also in the optical transmission apparatus, with the information fed back.

Fifthly, it is also a preferred mode that the constitution of the optical communication system disclosed in the fourth paragraph mentioned above comprises said plurality of optical transmission apparatuses, and an optical multiplexer for multiplexing optical signals output from the plurality of optical transmission apparatuses and transmitting them to said receiving apparatus, and said optical receiving apparatus has feedback means for feeding back said information to each of said plurality of optical transmission apparatuses individually, as said feedback means. In this way, the optical receiving apparatus does not need to use the AGC circuit for switching the received signal into high speed to perform gain adjustment on the received power, for the optical signals sent on a high-speed time-division system from the plurality of optical transmission apparatuses, unlike conventional systems.

BRIEF DESCRIPTION OF THE DRAWINGS

FIG. 4 is a block diagram schematically showing constitution of an optical communication system in accordance with another conventional example (the case of a plurality of optical transmission apparatuses and one optical receiving apparatus).

FIG. 5 illustrates the difference of reception levels in a plurality of transmission channels in the optical communication system in accordance with the conventional example shown in FIG. 4.

DETAILED DESCRIPTION OF THE PREFERRED EMBODIMENT

Hereinafter, embodiments of the present invention will be described in accordance with the accompanying drawings.

First Embodiment

Figure 1:
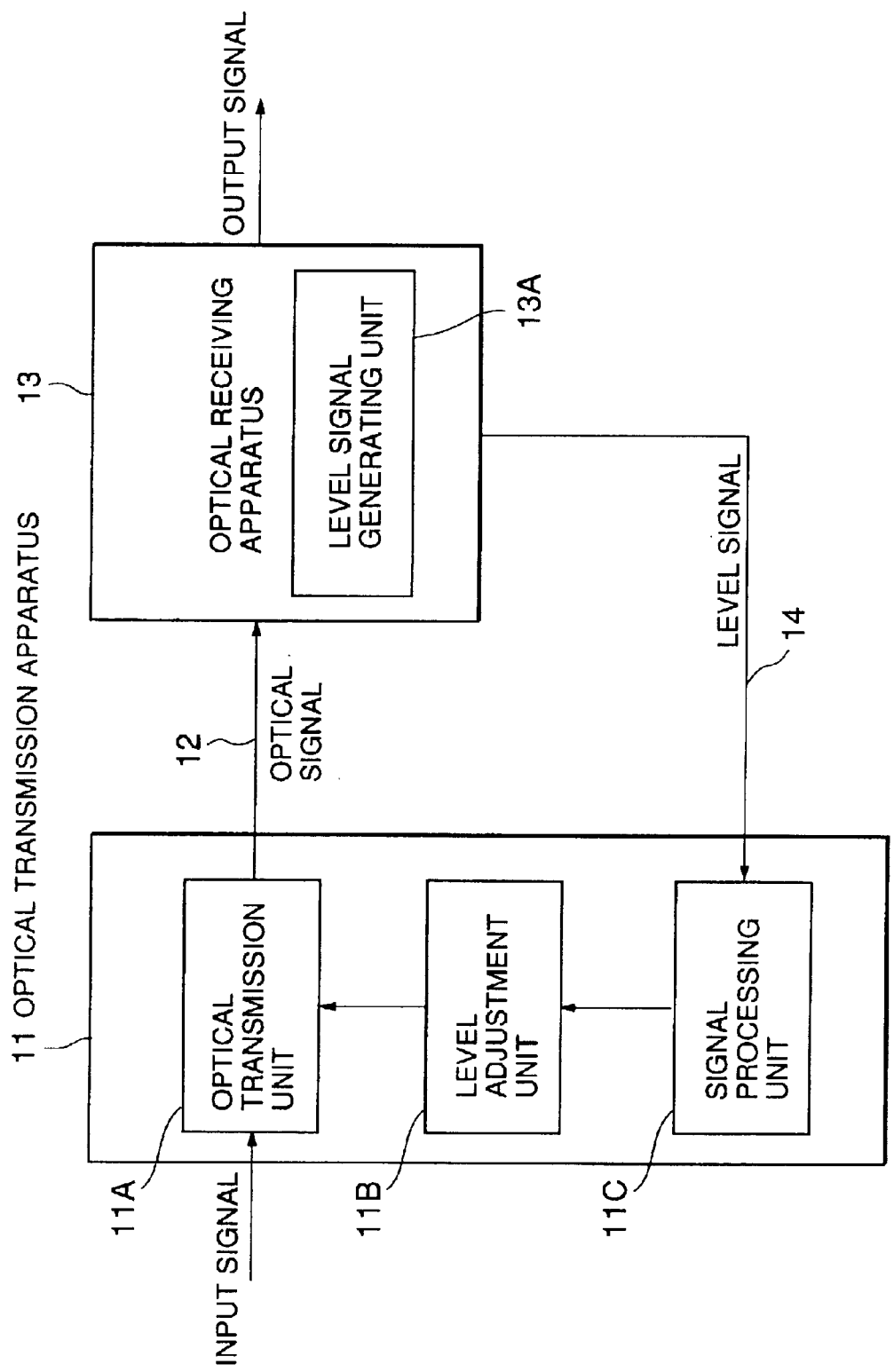
FIG. 1 is a block diagram schematically showing constitution in a first embodiment of an optical communication system in accordance with the present invention.

FIG. 1 illustrates a first embodiment of an optical communication system in accordance with the present invention.

This optical communication system comprises one optical transmission apparatus 11 for outputting an optical signal in response to an input signal of an electricity quantity, a transmission path 12 for transmitting the optical signal output by the optical transmission apparatus 11, and one optical receiving apparatus 13 for receiving the optical signal transmitted via the transmission path 12 and outputting an output signal of the electricity quantity in response to the optical signal. The transmission path 12 is constituted of, for example, an optical fiber or a telephone line.

The optical transmission apparatus 11 functionally comprises an optical transmission unit 11A, a level adjustment unit 11B for adjusting power of the optical signal output by the apparatus 11, and a signal processing unit 11C for receiving a level signal sent from a receiving end via a transmission path 14.

The optical signal output by the optical transmission unit 11A is transmitted to the optical receiving apparatus 13 via the transmission path 12. The level adjustment unit 11B adjusts the power of the optical signal output from the optical transmission unit 11A, in response to an adjustment signal output from the signal processing unit 11C. The signal processing unit 11C generates the adjustment signal in response to the level signal transmitted from the receiving end, and outputs this adjustment signal to the level adjustment unit 11B.

The optical receiving apparatus 13 has a level signal generating unit 13A for detecting the power of the received optical signal, and feeding back the level signal having information corresponding to this detected value to the signal processing unit 11C of the optical transmission apparatus 11 via the transmission path 14. This transmission path 14 for feedback is also constituted of the optical fiber or telephone line. This transmission path 14 may be used in common with the transmission path 12 for transmitting the optical signals. When the optical fiber (e.g., in common with the aforementioned transmission path 12) is used for the transmission path 14, the level signal is also once converted into the optical signal to be fed back.

In the present embodiment, the signal processing unit 11C constitutes information receiving means of a component of the present invention, the level adjustment unit 11B constitutes power adjustment means of a component of the present invention, and the level signal generating unit 13A and the transmission path 14 constitute feedback means of a component of the present invention.

Since the optical communication system in accordance with the present embodiment is constituted as above, the power of the optical signal output from the optical transmission apparatus 11 is automatically adjusted, according to the level signal fed back. This advance power adjustment at the transmitting end is performed so that the power of the optical signal received by the optical receiving apparatus 13 may always be a preset constant value. Consequently, even when attenuating conditions of transmitted power change in accordance with a transmission state of the transmission path 12, the optical signal received by the optical receiving apparatus 13 is always kept at about the constant value.

Therefore, it is no longer necessary for the optical receiving apparatus 13 to be equipped with the AGC circuit unlike the conventional optical communication systems. In addition, it is possible to obtain functions that can not be controlled and monitored by some of the conventional AGC circuits. In short, according to the control of the received power in the present embodiment, by setting the level adjustment performed by the level adjustment unit 11B for an appropriate maximum value, it is possible to control the received power not to exceed the absolute maximum rating of the optical receiving apparatus 13. Further, since the optical transmission apparatus 11 can detect that the received power is lower than the minimum light receiving power of the optical receiving apparatus 13 according to the information on the level signal fed back, it is possible to detect an abnormality in the transmission state accurately and rapidly and adopt proper measures against the abnormality.

Second Embodiment

Figure 2:
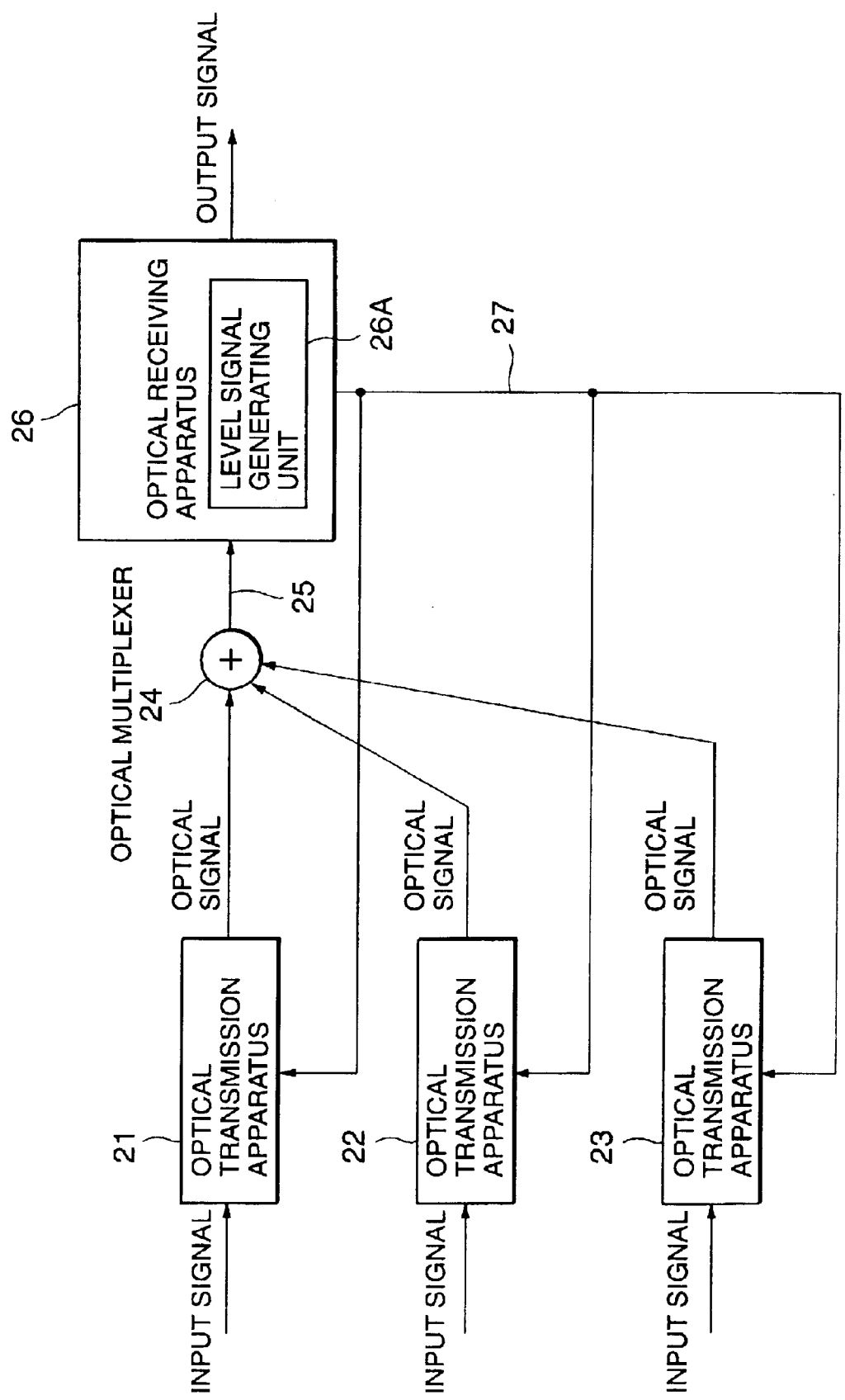
FIG. 2 is a block diagram schematically showing constitution in a second embodiment of the optical communication system in accordance with the present invention.
Figure 3:
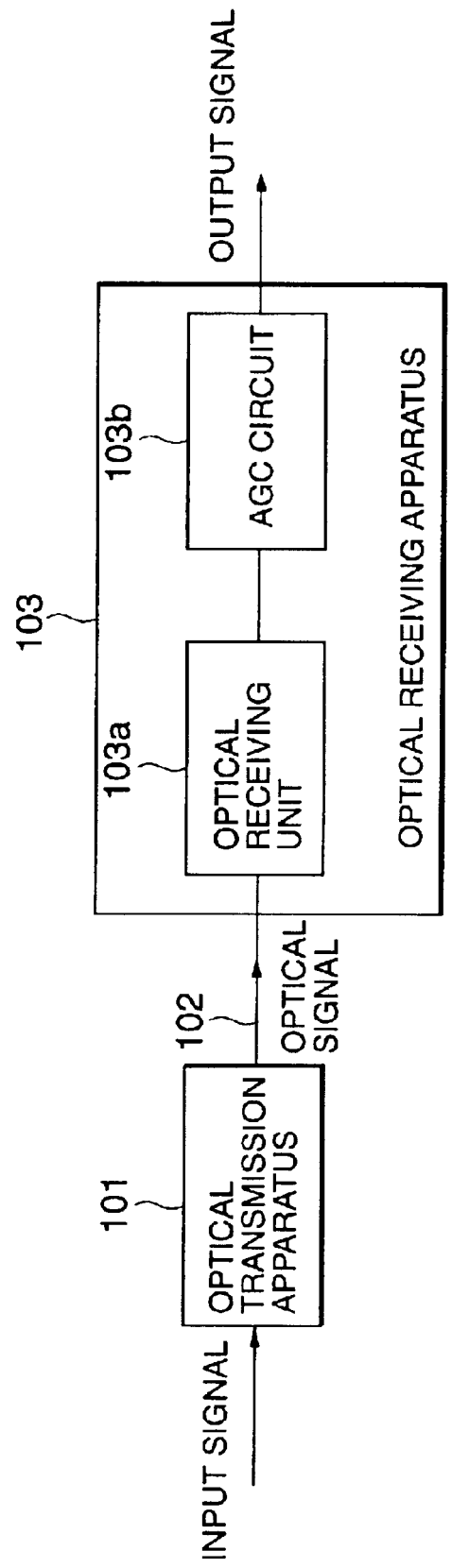
FIG. 3 is a block diagram schematically showing constitution of an optical communication system in accordance with one conventional example (the case of one optical transmission apparatus and one optical receiving apparatus).

FIG. 2 illustrates a second embodiment of the optical communication system in accordance with the present invention. This optical communication system comprises a plurality of optical transmission apparatuses.

Specifically, as shown in the same drawing, three optical transmission apparatuses 21 to 23 are provided. The optical signals output by these optical transmission apparatuses 21 to 23 are sent to one optical multiplexer 24 and multiplexed, for example, on the time-division system, and the multiplexed optical signals are sent to one optical receiving apparatus 26 via a transmission path 25.

Each of the optical transmission apparatuses 21 to 23 has the same constitution as the optical transmission apparatus in the first embodiment, and can output optical signals corresponding to input signals. It should be noted that the signal processing unit 11C functionally provided in each of the optical transmission apparatuses additionally has a function of extracting by time division only information about the level of an optical output signal of its apparatus that is allocated to its apparatus from the level signals sent from the receiving end.

Receiving the multiplexed optical signals that are received via the transmission path 25, the optical receiving apparatus 26 processes the optical signals output by each of the optical transmission apparatuses on the time-division system. In this way, the optical receiving apparatus 26 can output the received signals of an electric quantity corresponding to the optical signals transmitted from the optical transmission apparatuses 21 to 23.

In parallel with this receiving processing, the optical receiving apparatus 26 comprises a level signal generating unit 26A for detecting the power of the received signals from the optical transmission apparatuses 21 to 23 individually, and synthesizes level signals corresponding to these detected values, for example, on the time-division system to generate the level signals. The level signals generated by this level signal generating unit 26A are fed back to the optical transmission apparatuses 21 to 23 at the transmitting end via a transmission path 27.

In the present embodiment, the level signal generating unit 26A and the transmission path 27 constitute the feedback means of a component of the present invention.

Consequently, also in the optical communication system in accordance with the present embodiment, as in the first embodiment, the power of the optical signals transmitted from the plurality of optical transmission apparatuses 21 to 23, which is received by the optical receiving apparatus 26, is automatically adjusted to a preset value. In short, even when the attenuation amounts in the transmission path from each of the plurality of optical transmission apparatuses 21 to 23 to the optical receiving apparatus 26 are different with respect to every optical transmission apparatus (see FIG. 5), the power (level) of the optical signals received by the optical receiving apparatus 26 is kept at a constant value.

In this way, it is not necessary for the optical receiving apparatus to be equipped with the AGC circuit unlike the conventional system. Therefore, similarly to what has been described above, with the power control looking over the entire of the optical transmission apparatus and the optical receiving apparatus, it is possible to improve the function of power control and reinforce the monitoring of transmission states.

In addition, the optical communication system in accordance with the present invention is not limited to the constitution disclosed in the embodiments mentioned above, and various modifications can further be aimed without departing from the purpose disclosed in the appended claims.

As described above, according to the control method of received power in optical communication and the optical communication system in accordance with the present invention, since the power of the optical signal output from the optical transmission apparatus is controlled at the transmitting end to be the constant value preset in the optical receiving apparatus, it is not necessary to provide the automatic gain control circuit that has conventionally been required in the optical receiving apparatus, and this power control enables the power control that covers the entire from the receiving end to the transmitting end, thereby making it possible to improve the function of power control and reinforce the monitoring of transmission states.

In addition, the optical transmission apparatus and the optical receiving apparatus in accordance with the present invention function being placed in the optical communication system mentioned above, and can have the effects mentioned above.

What is claimed is:

1. A control method of received power in optical communication in which an optical signal is transmitted from a transmitting end to a receiving end, wherein:

information on the received power of said optical signal received by said receiving end is fed back from said receiving end to said transmitting end; and said transmitting end adjusts output power of said optical signal so that the received power at said receiving end may be constant.

2. An optical transmission apparatus for transmitting an optical signal to an optical receiving apparatus, comprising:

information receiving means for receiving information on received power of said optical signal fed back from said optical receiving apparatus; and power adjustment means for adjusting output power of said optical signal on the basis of the information received by said information receiving means so that the received power of said optical signal received by said optical receiving apparatus may be constant.

3. An optical receiving apparatus for receiving an optical signal transmitted from an optical transmission apparatus, comprising:

feedback means for feeding back information on the received power of said optical signal to said optical transmission apparatus.

4. An optical communication system for transmitting an optical signal output from an optical transmission apparatus to an optical receiving apparatus, wherein:

said optical transmission apparatus comprises information receiving means for receiving information on received power of said optical signal fed back from said optical receiving apparatus, and power adjustment means for adjusting output power of said optical signal from said optical transmission apparatus on the basis of the information received by the information receiving means so that the received power of said optical signal received by said optical receiving apparatus may be constant; and said optical receiving apparatus comprises feedback means for feeding back said information to said optical transmission apparatus.

5. The optical communication system according to claim 4, which comprises said plurality of optical transmission apparatuses, and an optical multiplexer for multiplexing optical signals output from said plurality of optical transmission apparatuses and transmitting them to said receiving apparatus, said optical receiving apparatus having feedback means for feeding back said information to each of said plurality of optical transmission apparatuses individually, as said feedback means.

* * * * *